INVENTOR.
EDWARD E. STRAUSS

March 10, 1953 — E. E. STRAUSS — 2,630,739
FILM HANDLING MECHANISM FOR VIEWING APPARATUS
Filed Nov. 16, 1949 — 8 Sheets-Sheet 7

INVENTOR.
EDWARD E. STRAUSS
BY Robert F. Miehle
Atty.

March 10, 1953 E. E. STRAUSS 2,630,739
FILM HANDLING MECHANISM FOR VIEWING APPARATUS
Filed Nov. 16, 1949 8 Sheets-Sheet 8

Fig. 13

INVENTOR.
EDWARD E. STRAUSS
BY Robert F. Miehle
Atty.

Patented Mar. 10, 1953

2,630,739

UNITED STATES PATENT OFFICE 2,630,739

FILM HANDLING MECHANISM FOR VIEWING APPARATUS

Edward E. Strauss, Highland Park, Ill., assignor Bell & Howell Company, Chicago, Ill., a corporation of Illinois Application November 16, 1949, Serial No. 127,629

7 Claims. (Cl. 88—28)

My invention relates particularly to viewing and copying apparatus such as is used for viewing microfilm records and making enlarged copies of desired portions thereof.

Objects of the invention reside in the provision of novel, efficient, compact and convenient viewing and copying apparatus which provides for feeding a record bearing film for viewing different portions thereof, which provides for angularly adjusting the images projected upon the viewing screen of the apparatus, which provides for laterally shifting the record bearing film with respect to the optical axis of the apparatus for scanning, which provides for changing the magnification of the images projected from the record bearing film, which provides for the release of the film in the projection gate of the apparatus during the feeding thereof, and which provides for making enlarged copies of desired portions of a record bearing film.

The invention will be better understood by reference to the accompanying drawing forming a part hereof and in which—

Referring to the drawing, a casing 1 is open at its front side as designated at 2, and the rear portion thereof projects downwardly from the main portion thereof as designated at 3. See Figures 1, 2 and 3. An enclosure forming frame 4 is secured to the front of the casing portion 3 and continuing the enclosure thereof, projects forwardly therefrom in downwardly spaced relation with the front portion of the casing 1.

Figure 5:
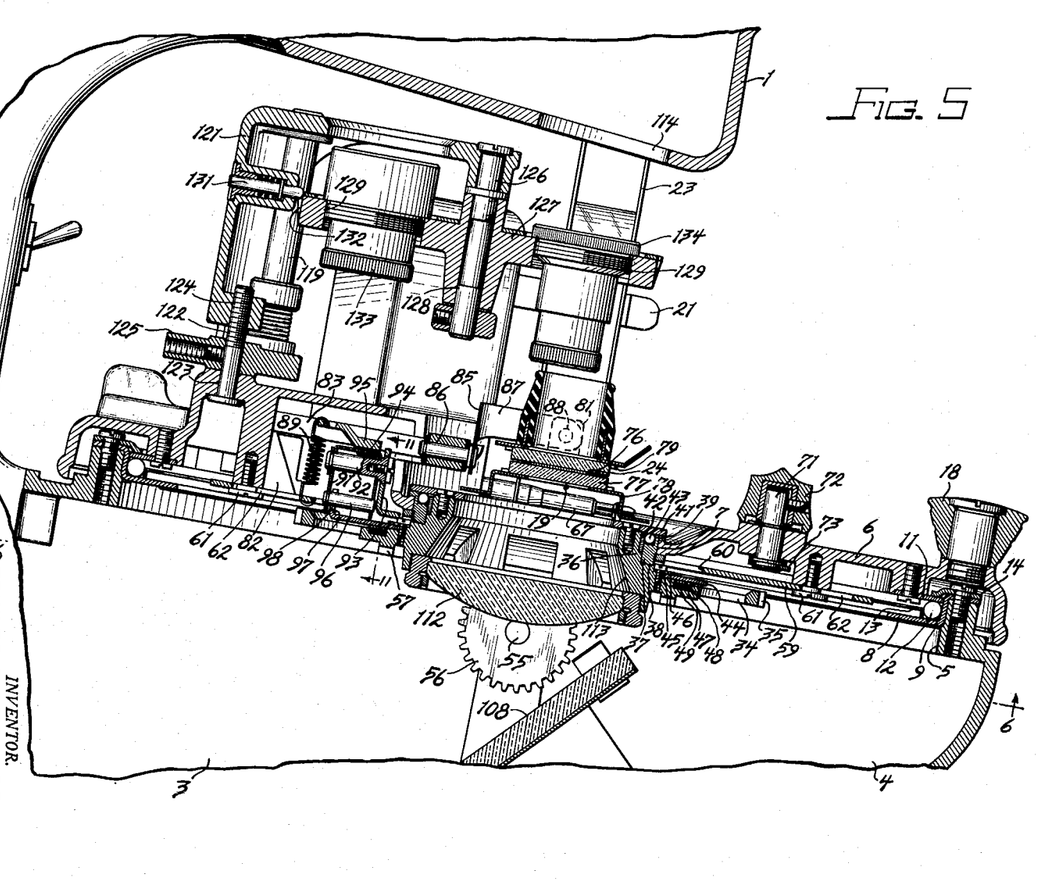
Figure 5 is a partial sectional view taken substantially on the line 5—5 of Figure 1.

The top of the frame 4 is provided with a large circular opening 5, see Figure 5, and a circular film carrying head 6 overlies the opening 5 and is provided with a central bore 7 therethrough, and is mounted on the top of the frame 4 for rotation about a generally vertical axis central of said bore and of the opening 5 by means of an annular bearing of greater diameter than the bore 7. This bearing comprises a shouldered bearing ring 8 providing an upwardly and inwardly facing ball race 9 and secured on the frame 4 in concentric relation with the opening 5, a flat bearing ring 11 secured on the head 6 in concentric relation with the bore 7 and having radial bearing engagement with the inwardly facing surface of the race 9, bearing balls 12 in the race 9 and downwardly on which the ring 11 engages, a ball retaining ring 13 on the interior of the balls 12 and retained between the rings 8 and 11, and a bearing ring 14 secured on the frame 4 and having bearing engagement downwardly on the ring 11 to prevent upward movement of the head.

Figure 6:
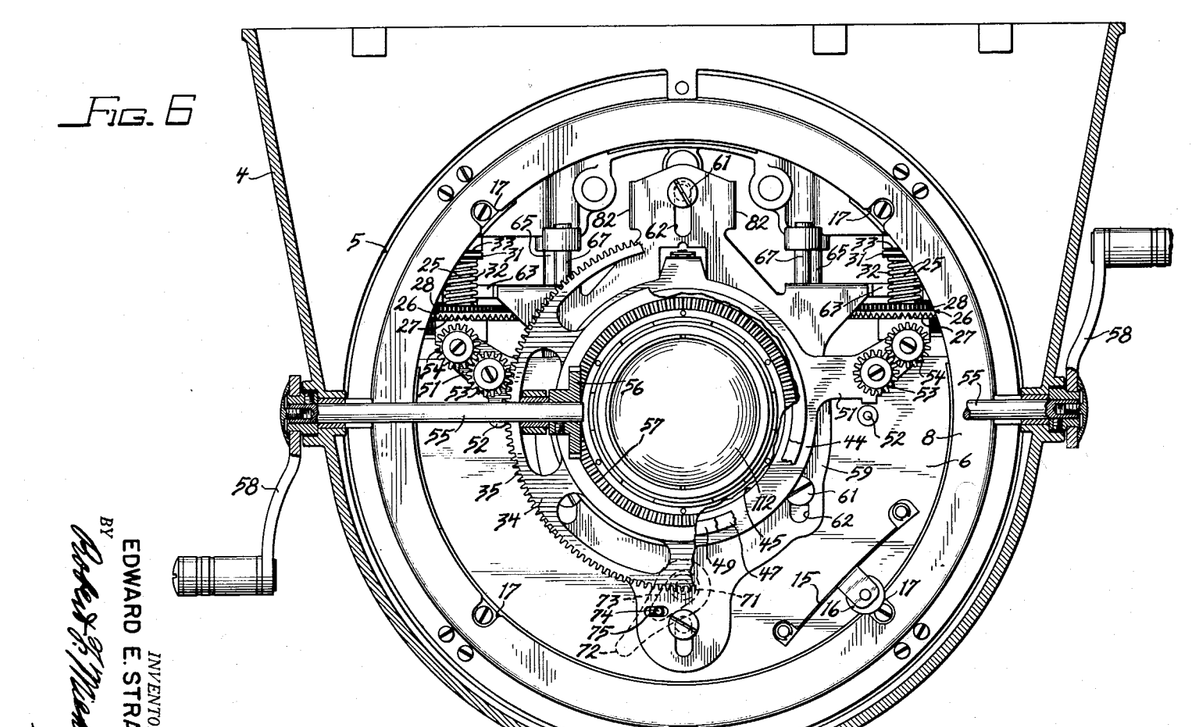
Figure 6 is a partial sectional view taken substantially on the line 6—6 of Figure 5.

The head 6 is yieldably maintained in any one of four equally spaced angular positions thereof, see Figure 6, by a resilient bracket 15 mounted on the under side of the head 6 and carrying a roller 16 which is yieldably urged by the resiliency of the bracket into engagement with the inner edge of the bearing ring 8 and into engagement with any one of four equally spaced notches 17 in the inner edge portion of the bearing ring 8. A knob 18, see Figure 5, on the upper side and adjacent the periphery of the head 6 serves for manually rotating the head to any of the angular positions thereof.

A projection film gate, generally designated at 19, is carried with the head 6 on the upper side thereof in a manner hereinafter described, and is disposed across the bore 7 and the rotational axis of the head for the projection of light therethrough. Two film spindles 21 are carried with the head 6 on the upper side thereof and are disposed beyond opposite ends of the film gate and transversely thereof, and extend through and are mounted for rotation and for axial shifting movement on hollow upward extensions 22 of the head 6. See Figures 1, 2, 4 and 7. Film reels 23 are detachably mounted on the projecting ends of the film spindles in rotatably fixed relation therewith in a usual manner for feeding a film 24 through the film gate 19 between the spindles from a roll of the film on one reel to a roll of the film on the other reel, the film spindles being alternately driven for feeding the film in opposite directions as hereinafter described.

Two shafts 25 are rotatably mounted within the head extensions 22 and are arranged in parallelism with the film spindles 21 and respectively below the same. See Figures 4, 6 and 7. Gear members 26 are fixed on the shafts 25 for rotation therewith and are provided with crown gears 27 and spur gears 28. The spur gears 28 respectively mesh with spur gears 29 secured on the film spindles 21 for rotating the film spindles and consequently the film reels respectively with rotation of the gear members 26, and the gears 29 are of sufficient width to maintain mesh with the gears 28 throughout the range of axial shift of the film spindles. The gear members 26 with their gears are disposed on opposite sides of an axial plane of the rotational axis of the head 6, and the crown gears 27 face in the same direction for a purpose hereinafter appearing. Friction devices serve to retard rotation of the shafts 25 and consequently rotation of the film spindles to overcome momentum of the film reels and the film rolls thereon, and, see Figure 4, comprise friction washers 31 engaged on the shafts 25 and fixed for rotation therewith and axially shiftable thereon and compression springs 32 encircling the shafts and urging the washers 31 into frictional engagement with bearings 33 fixed on the extensions 22 and in which the shafts 25 are journaled.

A spur ring gear 34 having a spur gear 35 on the periphery thereof is disposed on the under side of the head 6 and is rotatably mounted thereon in coaxial relation with the rotational axis of the head. See Figures 5 and 6. The rotatable mounting of the ring gear on the head 6 comprises a concentric bored hub 36 on the ring gear and projecting upwardly into the bore 7 of the head 6, a bearing ring 37 engaged in the bore 7 of and secured with the head 6 and into the bore of which the hub 36 of the ring gear projects and upwardly against which a shoulder 38 of the hub 36 has bearing engagement and provided with an upwardly and inwardly facing ball race 39, a bearing ring 41 secured downwardly on the upper end of the hub 36 and overlying the bearing ring 37, a bearing ring 42 surrounding the upper end of the hub 36 and fixed therewith, and bearing balls 43 engaged in the ball race 39 and engaged between it and the rings 41 and 42.

A bored control plate 44 is disposed below the head 6 and above the ring gear 34 and having the ring gear hub 36 projecting upwardly through the bore 45 thereof, is rotatably mounted on the ring gear for rotation about the rotational axis of the head 6 and the ring gear by means of the control plate, bore 45 having bearing engagement about the ring gear hub and a bearing ring 46 above the control plate and secured on the ring gear and confining the control plate between it and the ring gear. A circular friction clutch element 47 is arranged in a concentric circular groove 48 in the upper surface of the ring gear 34 and is yieldably urged upwardly into frictional engagement with the control plate by a circular spring 49 of wave form arranged in the groove underneath the clutch element to provide a yielding friction clutch connection between the ring gear and control plate so that the control plate, being carried with the head 6 for movement with respect thereto angularly about the axis of the head and ring gear, is yieldably actuated in opposite directions with rotation of the ring gear in opposite directions.

The control plate 44 is provided with two oppositely extending generally radial arms 51 which are alternately engageable against studs 52 on the head 6 to limit pivotal movement of the control plate relative to the head. See Figure 6. Spur gears 53 are respectively rotatably mounted on the control plate arms in axial parallelism with the ring gear 34 and mesh with the spur gear 35 of the ring gear, and additional spur gears 54 are respectively rotatably mounted on the control plate arms in axial parallelism with the ring gear 34 and respectively mesh with the spur gears 53 so that rotation of the ring gear relative to the head 6 and control plate 44 effects rotation of the gears 53 and 54.

Figure 9:
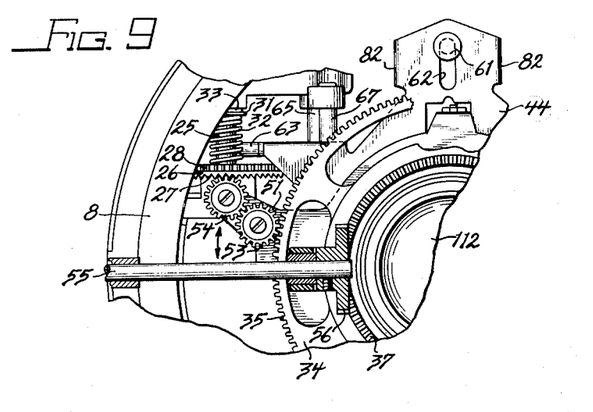
Figure 9 is a partial sectional view similar to Figure 6 and showing parts in different positions than those in which they are shown in Figure 6.

The gears 54 are disposed to alternately mesh with the crown gears 27 of the gear members 26 in opposite pivotal positions of the control plate 44, so that rotation of the ring gear 34 with respect to the head 6 in one direction initially causes pivotal movement of the control plate 44 with respect to the head to mesh one of the gears 54 with one of the crown gears 27, see Figure 9, and further rotation of the ring gear in the same direction rotates the corresponding film spindle 21 and film reel 23 mounted thereon to wind the film 24 on this reel and feed the film through the projection gate 19 in one direction, and rotation of the ring gear with respect to the head in the opposite direction initially causes pivotal movement of the control plate to mesh the other of the gears 54 with the other crown gear and further rotation of the ring gear in the latter direction rotates the other film spindle and the other film reel mounted thereon to wind the film on the latter reel and feed the film through the projection gate in the opposite direction.

Two spaced and alined shafts 55 extend transversely of the apparatus within and are rotatably mounted on the frame 4. These shafts are arranged radially of and on opposite sides of the rotational axis of and below the ring gear 34. See Figures 5, 6 and 9. Spur gears 56 secured on the inner ends of these shafts mesh with a downwardly facing crown gear 57 on the ring gear 34 so that rotation of either shaft 55 causes rotation of the ring gear. Crank handles 58 on the exterior of the frame 4 are secured on the outer ends of the shafts 55 for conveniently manually rotating these shafts to feed the film 24 through the projection gate 19, it being observed that by reason of the handles being on opposite sides of the frame 4, the film may be fed by either the right or left hand of the operator.

A bored shift plate 59 is disposed below the head 6 and above the control plate 44 and having the ring gear hub 36 projecting upwardly through the bore 60 thereof, see Figures 5, 6, 9 and 10, is mounted for shifting movement in its plane and normal to the rotational axis of the head 6 and transversely of the projection film gate 19 by means of headed and shouldered screw studs 61 on the head 6 and passing through parallel slots 62 in the shift plate.

Figure 4:
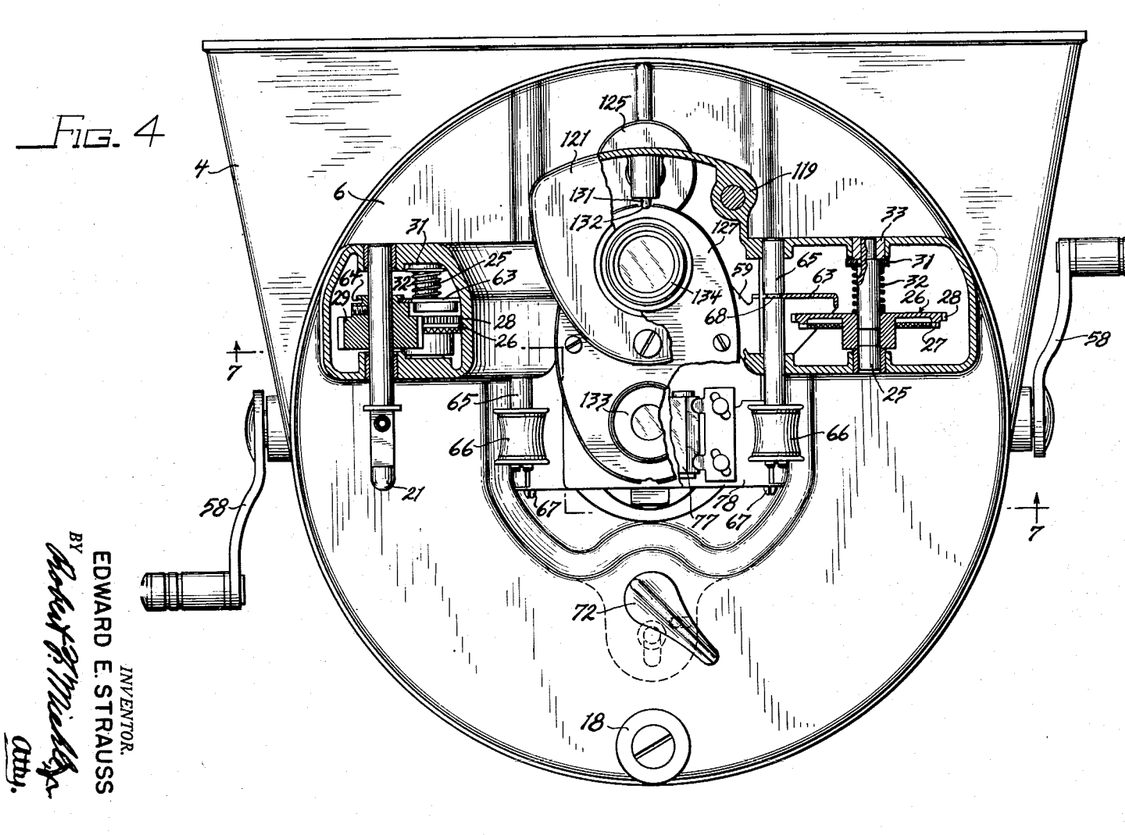
Figure 4 is partial view partially in section and taken substantially on the line 4—4 of Figure 1.
Figure 7:
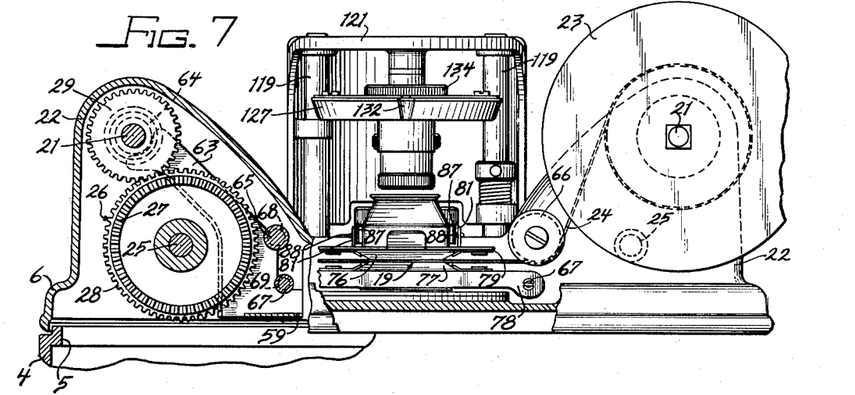
Figure 7 is a partial sectional view taken substantially on the line 7—7 of Figure 4.

The shift plate is provided with two upwardly projecting arms 63, see Figures 4 and 7, and the upper ends of these arms have bearing engagement in circumferential grooves 64 on the spindle gears 29 for simultaneously axially shifting the film spindles 21 and the film reels 23 thereon with shifting of the shift plate. Two guide roller spindles 65 are disposed between opposite ends of the projection film gate 19 and the film reels 23 on the film spindles 21 and transversely of the film gate, and extend through and are mounted for axial shifting movement on the head extensions 22. Guide rollers 66 are rotatably mounted on the projecting ends of the spindles for guiding the film between the reels 23 and the ends of the film gate, the film 24 being trained under the rollers for this purpose as shown in Figure 7. Two support spindles 67 are disposed beyond opposite ends of the film gate 19 and below the spindles 65 and transversely of the film gate, and extend through and are mounted for axial shifting movement on the head extensions 22. The arms 63 of the shift plate 59 also have bearing engagement in circumferential grooves 68 of the spindles 65 and in circumferential grooves 69 of the spindles 67, so that the film spindles 21 and the film reels 23, the guide roller spindles 65 and the support spindles 67 are simultaneously axially shifted with shifting of the shift plate.

A vertically disposed shaft 71 extends through and is mounted for rotation on the head 6, see Figures 4, 5 and 6, and a manipulating arm 72 is secured on this shaft above the head so that the shaft can be manually actuated. A crank arm 73 is secured on the lower end of the shaft 71 and is provided with a crank stud 74 which has bearing engagement in a slot 75 in the shift plate 59 and extending transversely of the shift plate bearing slots 62, so that the shift plate is shifted with pivotal movement of the manipulating arm 72.

Figure 10:
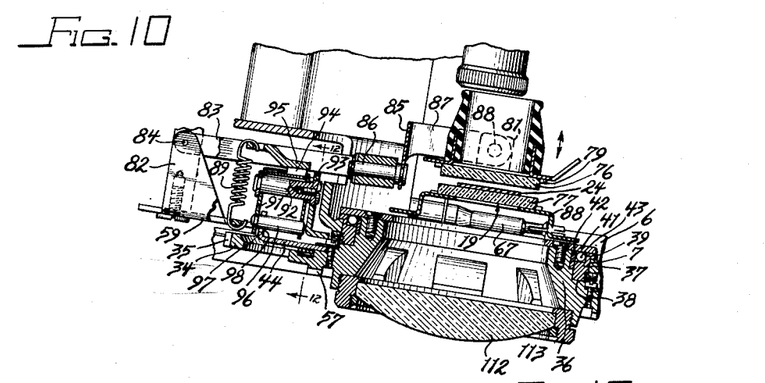
Figure 10 is a partial sectional view similar to Figure 5 and showing parts in different positions than those in which they are shown in Figure 5.

The projection film gate 19, see Figures 5, 7 and 10, comprises upper and lower transparent gate members 76 and 77, of which the lower gate member 77 is mounted on a carrier 78 detachably mounted on the support spindles 67 in a manner unnecessary to be described, so that the lower gate member is shifted transversely of the film gate with shifting of the shift plate 59. The upper gate member 76 is mounted on a carrier 79 provided with two upwardly extending lugs 81 spaced longitudinally of the gate and disposed intermediate the sides of the gate. The shift plate 59 is provided at one end thereof with two spaced upwardly extending arms 82, and an arm 83 is pivotally mounted on these arms, as designated at 84, on an axis disposed transversely of the rotational axis of the head 6 and transversely of the shifting movement of the shift plate.

The arm 83 extends from its pivotal mounting toward the film gate, and a horizontally disposed U-shaped yoke 85 has the intermediate portion of its base pivotally mounted, as designated at 86, on the free end of the arm 83 on a horizontal axis disposed radially of the arm and parallel to the legs of the yoke. The free ends of the legs 87 of the yoke 85 are detachably pivotally connected to the lugs 81, as designated at 88, on a horizontal axis extending longitudinally of the film gate and transversely of the axis of the pivotal mounting 86, so that the upper gate member 76 is universally tiltable for assuming parallel relation with the lower gate member 77 as the upper gate member clamps the film 24 between it and the lower gate member for the projection of images from the film, and a tension spring 89 is operative between the shift plate 59 and the arm 83 to normally urge this arm and the upper gate member 76 downwardly to clamp the film between the upper gate member and the lower gate member 77.

Figure 11:
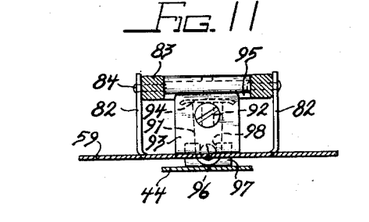
Figures 11 and 12 are partial sectional views taken substantially on the line 12—12 of Figure 10 and showing parts in different positions.
Figure 12:
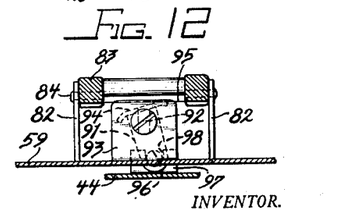

A lever 91 is pivotally mounted, as designated at 92, on an upwardly extending arm 93 of the shift plate 59 on an axis disposed radially of the rotational axis of the head 6 and longitudinally of the shifting movement of the shift plate. See Figures 5, 10, 11 and 12. The upper end of the lever 91, above the pivotal mounting thereof, is provided with a horizontally disposed portion 94 extending on both sides of the vertical axial plane of the pivotal mounting 92, and the portion 94 has abutting engagement upwardly against a portion 95 of the arm 83 and actuates this arm upwardly against the influence of the spring 89 with pivotal movement of the lever 91 in either direction from a central position thereof to actuate the upper gate member 76 upwardly and thus separate it from the lower gate member and release the film 24 for the feeding thereof. Figures 5 and 11 show the lever 91 in its central position in which the film is clamped between the gate members 76 and 77 for the projection of images from the film, and Figures 10 and 12 show the lever 91 in a position at one side of its central position in which the gate members are separated to release the film for the feeding thereof.

The lower end of the lever 91, below the pivotal mounting thereof, is provided with a stud 96 extending longitudinally of the shifting movement of the shift plate 59, and the control plate 44 is provided with an upwardly extending lug 97 provided with a vertical slot 98 in which the stud 96 is engaged for pivotal and sliding movement. Thus, pivotal movement of the control plate relative to the head 6 in either direction from a central position actuates the lever 91 from its central position and thus separates the gate members 76 and 77, and positioning of the control plate in its central position permits the spring 89 to clamp the film between the gate members and return the lever 91 and control plate 44 to their central positions, the spring being of sufficient strength to accomplish this providing the handles 58 are released. Longitudinal sliding of the stud 96 in the slot 98 permits shifting of the shift plate 59 relative to the control plate 44. The upper gate member 76 being carried with the shift plate 59 and the lower gate member 77 being mounted on the support spindles 67, shifting of the shift plate shifts the film gate 19 and the film 24 therein simultaneously with shifting of the guide rollers 66, the film spindles 21 and the film reels 23 for shifting the film transversely with respect to a portion of the optical axis of the projection system of the apparatus, which is coincident with the rotational axis of the head 6, to provide for scanning of the film transversely thereof, the film being angularly adjusted by angular adjustment on its rotational axis for orienting the images projected from the film.

For the feeding of the film 24 to bring a desired portion of the film for the projection of an image thereof either crank handle 58 is rotated in the appropriate direction. Initial rotation of a crank handle causes pivotal movement of the control plate 44 and lever 91 out of their central positions to engage one of the spur gears 54 with its crown gear 57 for driving the corresponding film spindle 21 and film reel 23 to feed the film and separate the gate members 76 and 77 to free the film for the feeding thereof, and further rotation of the crank handle in the same direction maintains the separation of the gate members and the engagement of the said spur gear with its crown gear and causes rotation of the corresponding film spindle and film reel to feed the film. When the desired portion of the film arrives at the film gate 19 rotation of the crank handles is stopped and they are left free whereupon the spring 89 returns the control plate and lever 91 to their central positions, thus clamping the film between the gate members for the projection of the desired image on the film and disengaging the previously engaged gear 54 and crown gear 27. The same action takes place in either direction of rotation of a crank handle for feeding the film in either direction.

Figure 1:
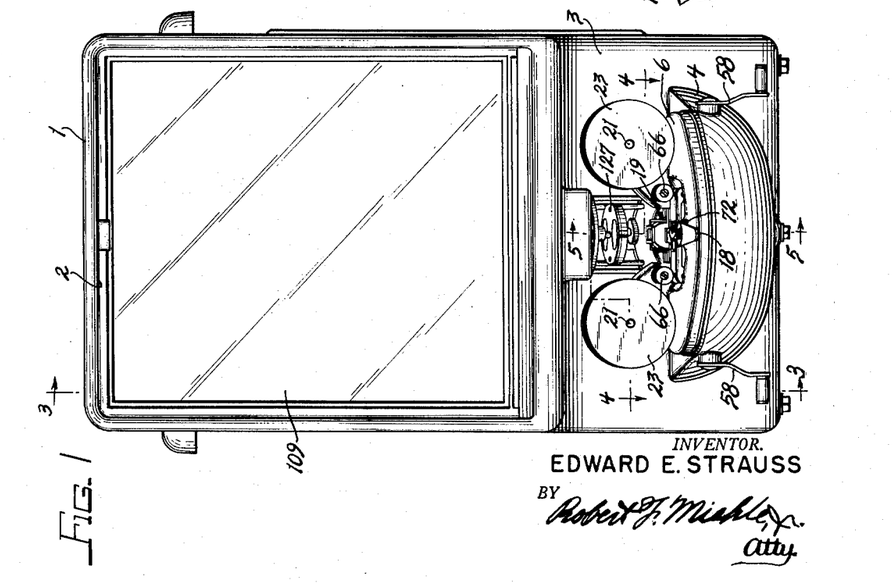
Figure 1 is a front elevation of a viewing and copying apparatus embodying my invention.
Figure 3:
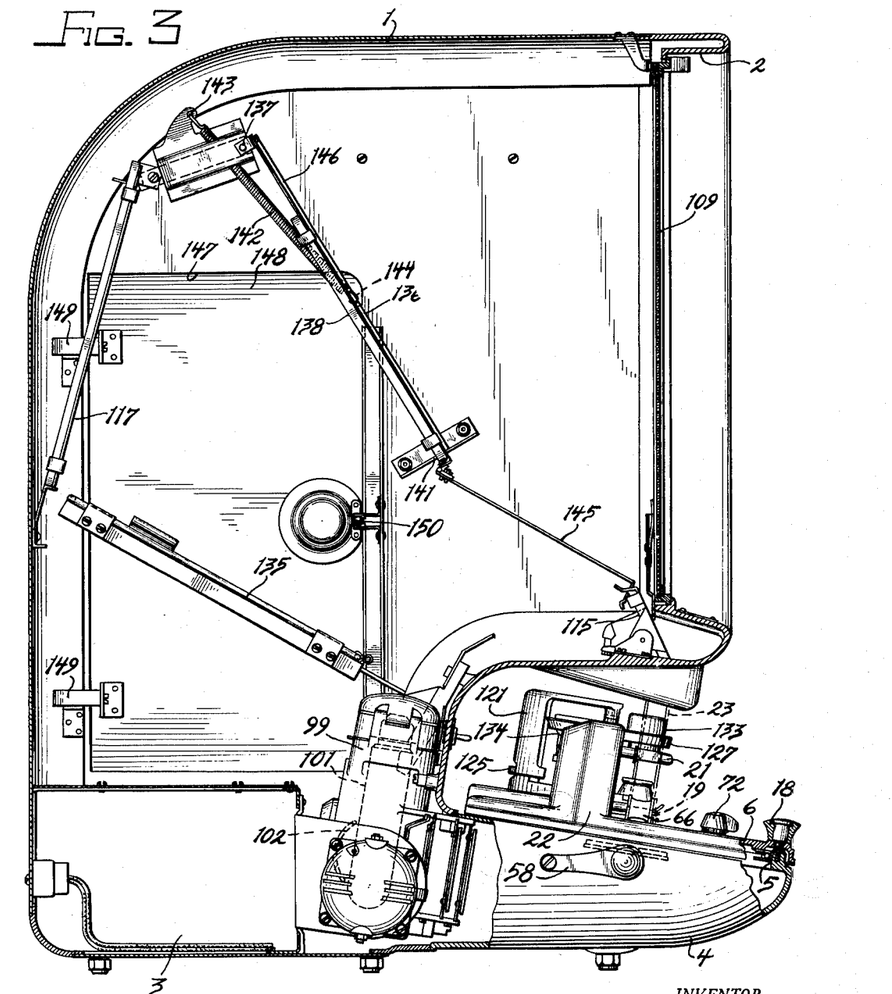
Figure 3 is a sectional view taken substantially on the line 3—3 of Figure 1.
Figure 13:
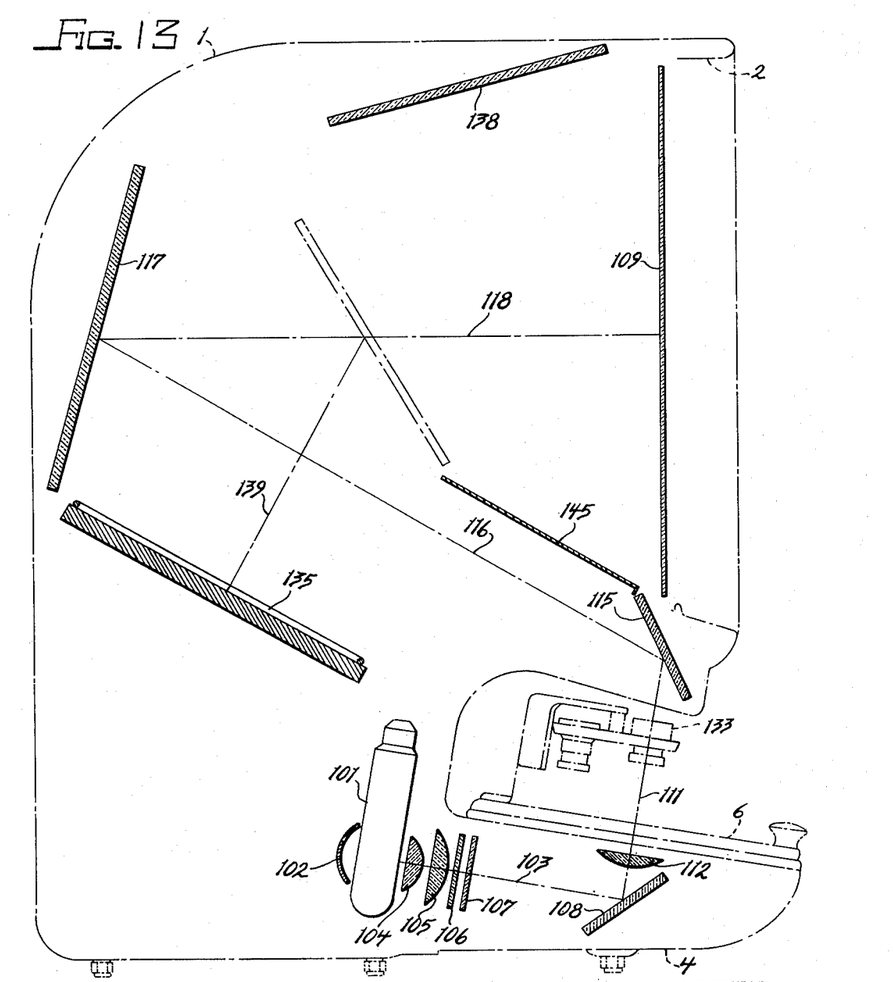
Figure 13 is a partial schematic and sectional view in side elevation illustrating the optical system of the apparatus.

A ventilated lamp house 99 is mounted within the lower rear part 3 of the casing 1, see Figure 3, and an incandescent electric lamp 101 and a forwardly directed concave reflector 102 disposed to the rear of the lamp, see Figure 13, are disposed within the lamp house for projecting light forwardly therefrom, as designated at 103, and through two condenser lenses 104 and 105 and two heat filters 106 and 107 carried with the lamp house and to a rearwardly and upwardly directed reflector 108, mounted within the frame 4, which, see Figures 5 and 13, reflects light from the lamp, from below a vertically disposed viewing screen 109 mounted on the casing 1, as shown in Figures 1 and 3, and disposed across the front opening 2 of the casing, and upwardly, as designated at 111, within the casing at the forward portion thereof and along the rotational axis of the head 6 and through a condenser lens 112 mounted within the lower portion of the bore 113 of the ring gear 34, through this bore, through the film gate 19 and the film 24 therein, and through a light opening 114 in the lower wall of the casing 1.

A reflector 115 is mounted forwardly within the casing 1 and below the screen 109, see Figures 3, 8 and 13, and is directed rearwardly and downwardly to reflect light from the reflector 108 upwardly and rearwardly, as designated at 116. A reflector 117 is mounted rearwardly within the casing and upwardly with respect to the reflector 115 and is directed downwardly and forwardly for reflecting light from the reflector 115 forwardly to the screen 109 as designated at 118.

Two parallel rods 119 are mounted on the head 6 and extend upwardly therefrom in parallelism with the rotational axis of the head. See Figures 4, 5 and 7. A lens carrier support 121 is slidably mounted on the rods 119 for adjustment longitudinally of the rotational axis of the head, and a screw 122 is rotatably mounted on the head, as designated at 123, on an axis parallel to the rods 119 and is screwthreaded into the support 121 as designated at 124. The screw 122 is conveniently manually rotated by a wheel 125 secured on the screw.

A spindle 126 is secured on the support 121 in parallelism with the rotational axis of the head 6, and a lens carrier 127 is rotatably mounted on this spindle as designated at 128 and is provided with two diametrically opposite threaded lens mount openings 129 which are selectively registrable with the rotational axis of the head 6, a spring detent device 131 on the support 121 cooperating with two diametrically opposite detent notches 132 on the periphery of the lens carrier to releasably position the lens carrier in the positions thereof in which the lens mount openings register with the rotational axis of the head 6.

Projection lenses 133 and 134 of different focal lengths are respectively mounted in the lens mount openings 129 of the lens carrier 127, and when either lens is in registry with the rotational axis of the head 6, the light passing through the film at the film gate 19 passes through this lens for the projection of enlarged images onto the viewing screen 109 from the film, the adjustment of the support 121 by rotation of the adjustment screw 122 serving for focusing the lenses and the lenses being so positioned axially on the lens carrier that they are simultaneously focused. The lenses 133 and 134, being of different focal lengths, provide different magnification of the images so that different magnifications are conveniently available by rotation of the lens carrier 127 to position the desired projection lens in registry with the rotational axis of the head 6.

Figure 8:
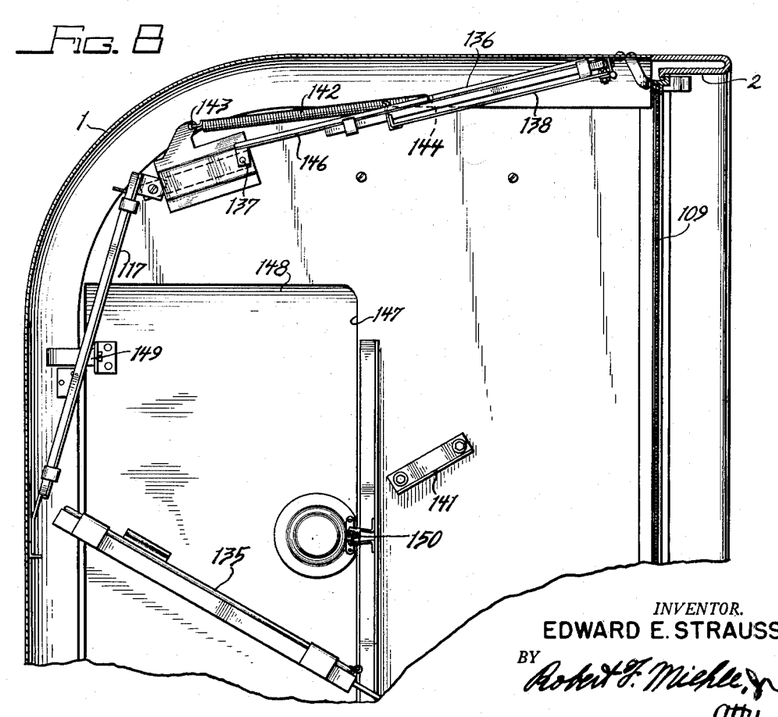
Figure 8 is a partial sectional view similar to Figure 3 and showing parts in different positions than those in which they are shown in Figure 3.

An upwardly directed printing frame 135 of usual construction, see Figures 3, 8 and 13, is mounted within the casing 1 and is disposed downwardly with respect to the light path 118 from the reflector 117 to the viewing screen 109 and the light path 116 from the reflector 115 to the reflector 117 and rearwardly with respect to the reflector 115. A reflector plate 136 within the casing 1 is carried on coaxial pivotal mountings 137 mounted on opposite sides of the casing for pivotal movement on an axis disposed rearwardly within the casing and upwardly with respect to the light path 118, and a downwardly directed reflector 138 is mounted on the plate 136 for pivotal movement therewith on this axis, from a lower position, as shown in Figure 3 and in dot and dash lines in Figure 13, between the reflector 117 and the viewing screen 109 and directed downwardly and rearwardly for reflecting light, as designated at 139 in Figure 13, from the reflector 117 to the printing frame 135 for the printing of enlarged images from film in the film gate 19 onto photographically sensitized paper on the print frame, to an upper position, as shown in Figure 8 and in full lines in Figure 13, above the light path 118 for the projection of enlarged images from film in the film gate 19 onto the viewing screen 109 for the viewing of these images.

The top wall of the casing 1 provides a stop for positioning the reflector plate 136 and reflector 138 in the upper position thereof, and stops 141 on the sides of the casing provide a stop for positioning this reflector plate and reflector in the lower position thereof. Tension springs 142 at the sides of the casing 1, have their ends respectively connected with the casing and reflector plate, as designated at 143 and 144, and as so connected have over center relation with respect to the pivotal axis of this reflector plate and reflector for maintaining them in either of said positions thereof.

A light shield 145, mounted within the casing 1, is disposed between the light path 116 from the reflector 115 to the reflector 117 and the light path 118 from the reflector 117 to the viewing screen 109 and extends between the lower portions of the viewing screen and the reflector 138 when the latter reflector is positioned to reflect light to the printing frame 135 so that light cannot pass under the reflector 138 from the viewing screen and interfere with the printing operation, and the reflector plate 136 is extended rearwardly from the reflector 138, as designated at 146, for preventing light from passing over the reflector 138 and interfering with the printing operation.

Figure 2:
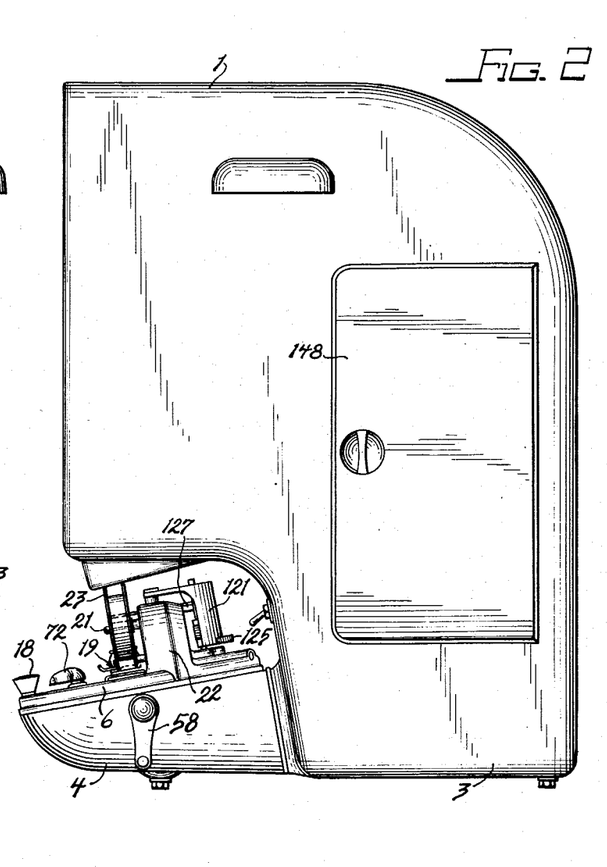
Figure 2 is a side elevation of the same.

One side of the casing 1 is provided with an opening 147 providing access into the casing for the printing operation and for positioning the reflector 138, see Figures 2, 3 and 8, and a door 148 normally closes said opening and is hinged on the casing, as designated at 149, for movement out of position closing the opening, a releasable latch 150 serving to hold the door in closed position.

The above described arrangement for printing enlarged images from film in the film gate 19 is the subject matter of my copending application, Serial No. 196,475, filed November 18, 1950, for improvement in Viewing and Copying Apparatus, which is a division of this application.

While I have thus described my invention, I do not wish to be limited to the precise details described, as changes may be readily made without departing from the spirit of my invention, but having thus described my invention, I claim as new and desire to secure by Letters Patent the following:

1. In a viewing device, the combination of a support, a head provided with a central bore therethrough, an annular bearing of greater diameter than said bore and carrying said head on said support for rotation about the axis of said bore, two film winding elements rotatably mounted on said head, a ring member, a bearing carrying said ring member on said head for rotation about said axis including a concentric bored hub on said ring member and projecting into said central bore, rotatory drive means on said support and engaging said ring member for rotating the same, and transmission mechanism operative to alternately drive said winding elements in response to rotation of said ring member in opposite directions and comprising a bored control member through the bore of which said hub projects and mounted on said ring member for rotation about said axis and a yielding friction clutch connection between said ring and control members.

2. In a viewing device, the combination of a support, a head provided with a central bore therethrough, an annular bearing of greater diameter than said bore and carrying said head on said support for rotation about an axis central of said bore, two film reel spindles rotatably mounted on said head, a spur ring gear mounted for rotation about said central axis with respect to said support and head, rotatory drive means on said support and engaging said ring gear for rotating the same, two crown gears rotatably mounted on said head on axes disposed transversely of said central axis and respectively connected with said spindles for driving the same, and transmission mechanism comprising a control member carried with said head for pivotal movement with respect thereto in a plane normal to said central axis, a yielding friction clutch connection between said ring gear and control member, and spur gearing rotatably mounted on said control member in axial parallelism with said ring gear and engaged therewith and alternately engageable with said crown gears in opposite pivotal positions of said control member.

3. In a viewing device, the combination of a support, a head provided with a central bore therethrough, an annular bearing of greater diameter than said bore and carrying said head on said support for rotation about an axis central of said bore, two film spindles rotatably mounted on said head on parallel axes disposed transversely of said central axis, a spur ring gear mounted for rotation about said central axis with respect to said support and head, rotatory drive means on said support and engaging said ring gear for rotating the same, two crown gears rotatably mounted on said head on axes disposed transversely of said central axis and in parallel relation with said spindles, spur gears respectively fixed for rotation with said crown gears, additional spur gears respectively fixed for rotation with said spindles and respectively engaging said first mentioned spur gears, and transmission mechanism comprising a bored control member carried with said head for pivotal movement concentrically of its bore and about said central axis, a yielding friction clutch connection between said ring gear and control member, and spur gearing rotatably mounted on said control member in axial parallelism with said ring gear and engaged therewith and alternately engageable with said crown gears in opposite pivotal positions of said control member.

4. In a viewing device, the combination of a support, a head provided with a central bore therethrough, an annular bearing of greater diameter than said bore and carrying said head on said support for rotation about an axis central of said bore, two film reel spindles rotatably and axially shiftably mounted on said head on parallel axes disposed transversely of said central axis, a shift member shiftably mounted on said head and connected with said spindles for correspondingly axially shifting the same, a spur ring gear, a bearing carrying said ring gear on said head for rotation about said central axis including a concentric bored hub on said ring member and projecting into said central bore, rotatory drive means on said support and engaging said ring gear for rotating the same, two crown gears rotatably mounted on said head on axes disposed transversely of said central axis and in parallel relation with said spindles, spur gears respectively fixed for rotation with said crown gears, additional spur gears respectively fixed for rotation and axial shifting with said spindles and respectively engaging said first mentioned spur gears, transmission mechanism comprising a bored control member through the bore of which said hub projects and mounted on said ring gear for rotation about said axis, a yielding friction clutch connection between said ring gear and control member, and spur gearing rotatably mounted on said control member in axial parallelism with said ring gear and engaged therewith and alternately engageable with said crown gears in opposite pivotal positions of said control member.

5. In a viewing device, the combination of a support, a head provided with a central bore therethrough and mounted on said support for rotation about an axis central of said bore, a projection film gate carried with said head and disposed across said axis and comprising opposing gate members between which a film is engaged, two film winding spindles rotatably mounted on said head, a ring member mounted for rotation about said axis with respect to said support and head, rotatory driving means on said support and engaging said ring member for rotating the same, transmission mechanism operative to alternately drive said spindles in response to rotation of said ring member in opposite directions and comprising a control member carried with said head for pivotal movement with respect thereto about said axis and a yielding friction clutch connection between said ring and control members, a member carrying one of said gate members and carried with said head for movement with respect thereto longitudinally of said central axis and yieldably urged in the direction to move said one gate member toward the other gate member to clamp a film therebetween, a lever member carried with said head for pivotal movement on an axis radial of said central axis and having abutting engagement with said gate carrying member on opposite sides of an axial plane of said lever member axis to actuate said gate carrying member to separate said gate members with pivotal movement of said lever member in either direction from a central position thereof, and a connection between said control and lever members for actuating said lever member with pivotal movement of said control member in either direction from a central position thereof.

6. In a viewing device, the combination of a support, a head provided with a central bore therethrough and mounted on said support for rotation about an axis central of said bore, a projection film gate carried with said head and disposed across said axis and comprising opposing gate members between which a film is engaged, two rotatable and axially shiftable film winding spindles carried with said head and disposed beyond opposite ends of said gate on axes disposed transversely of said gate, a ring member mounted for rotation about said central axis with respect to said support and head, rotatory drive means on said support and engaging said ring member for rotating the same, transmission mechanism operative to alternately drive said spindles in response to rotation of said ring member in opposite directions and comprising a control member carried with said head for pivotal movement with respect thereto in a plane normal to said central axis and a yielding friction clutch connection between said ring and control members, means for simultaneously shifting said spindles and gate with respect to said head and transversely of said gate comprising a shift member mounted on said head for movement radially of said head, a member carrying one of said gate members and mounted on said shift member for movement with respect thereto longitudinally of said central axis and yieldably urged in the direction to move said one gate member toward the other gate member to clamp a film therebetween, a lever member pivotally mounted on said shift member on an axis radial of said central axis and having abutting engagement with said gate carrying member on opposite sides of an axial plane of said lever member axis to actuate said gate carrying member to separate said gate members with pivotal movement of said lever member in either direction from a central position thereof, and a pivotal and sliding connection between said control and lever members for actuating said lever member with pivotal movement of said control member in either direction and permitting relative movement between said control and lever members radially of said central axis.

7. In a viewing device, the combination of a support, a head provided with a central bore therethrough and mounted on said support for rotation about an axis central of said bore, a projection gate carried with said head and disposed across said axis and comprising opposing gate members between which film is engaged, two film winding spindles rotatably and axially shiftably mounted on said head and disposed beyond opposite ends of said gate on axes disposed transversely of said gate, a ring member mounted for rotation about said central axis with respect to said support and head, rotatory drive means on said support and engaging said ring member for rotating the same, transmission mechanism operative to alternately drive said spindles in response to rotation of said ring member in opposite directions and comprising a bored control member carried with said head for pivotal movement concentrically of its bore and about said central axis and a yielding friction clutch connection between said ring and control members, a gate mounting carrying one of said gate members and mounted on said head for movement transversely of said gate, a shift member mounted on said head for movement transversely of said gate and connected with said spindles and gate mounting for correspondingly shifting the same, an arm carrying the other of said gate members for movement to and from said one gate member and pivotally mounted on said shift member on an axis disposed transversely of said central axis and transversely of the shifting movement of said shift member and yieldably urged in the direction to move said other gate member toward said one gate member to clamp a film therebetween, a lever pivotally mounted on said shift member on an axis disposed radially of said central axis and longitudinally of the shifting movement of said shift member and having abutting engagement with said gate carrying arm on opposite sides of an axial plane of said lever axis to actuate said gate carrying arm to separate said gate members with pivotal movement of said lever member in either direction from a central position thereof, and a pivotal and slidable connection between said control and lever members for actuating said lever member with pivotal movement of said control member in either direction from a central position thereof and permitting relative movement between said control and lever members radially of said axis.

EDWARD E. STRAUSS.

REFERENCES CITED

The following references are of record in the file of this patent:

UNITED STATES PATENTS

| Number | Name | Date |
|---|---|---|
| 1,424,457 | Fegraeus | Aug. 1, 1922 |
| 1,494,801 | Pittman | May 20, 1924 |
| 2,065,993 | Billing | Dec. 29, 1936 |
| 2,172,256 | Nagel | Sept. 5, 1939 |
| 2,226,618 | Kuppenbender | Dec. 31, 1940 |
| 2,279,463 | Hopkins | Apr. 14, 1942 |
| 2,332,810 | Place | Oct. 26, 1943 |
| 2,432,704 | Warman | Dec. 16, 1947 |
| 2,493,998 | Pratt | Jan. 10, 1950 |
| 2,517,414 | Pratt et al. | Aug. 1, 1950 |

FOREIGN PATENTS

| Number | Country | Date |
|---|---|---|
| 178,826 | Switzerland | Oct. 16, 1935 |